United States Patent [19]

Mori

[11] 4,340,812
[45] Jul. 20, 1982

[54] RADIATION ENERGY COLLECTION AND TRACKING APPARATUS

[76] Inventor: Kei Mori, 3-16-3-501, Kaminoge, Setagaya-ku, Tokyo, Japan

[21] Appl. No.: 131,693

[22] Filed: Mar. 19, 1980

[30] Foreign Application Priority Data

Mar. 26, 1979 [JP] Japan .................................. 54-34243
Mar. 31, 1979 [JP] Japan .................................. 54-37732
Mar. 31, 1979 [JP] Japan .................................. 54-37733
Jul. 5, 1979 [JP] Japan .................................. 54-84406
Nov. 8, 1979 [JP] Japan .................................. 54-144662
Nov. 8, 1979 [JP] Japan .................................. 54-144663
Nov. 13, 1979 [JP] Japan .................................. 54-146962
Nov. 22, 1979 [JP] Japan .................................. 54-151392

[51] Int. Cl.³ .............................................. G01J 1/20
[52] U.S. Cl. .................................. 250/203 R; 126/425; 350/258
[58] Field of Search .................. 250/203 R, 209, 227, 250/216; 126/424, 425; 350/258, 262, 264

[56] References Cited

U.S. PATENT DOCUMENTS

3,496,367  2/1970  Eckermann .................... 250/203 R
3,511,559  5/1970  Foster ............................ 350/258
4,192,583  3/1980  Horton ........................... 126/425
4,198,826  4/1980  Chromie ....................... 250/203 R
4,276,122  6/1981  Snyder ........................... 126/425

*Primary Examiner*—David C. Nelms
*Attorney, Agent, or Firm*—Burgess, Ryan and Wayne

[57] ABSTRACT

A light energy collection apparatus comprising an optical system for collecting the light energy, a framework for supporting the optical system, a tracking device for driving the supporting framework so as to normally keep the optical system pointed at a light source, an optically transparent housing enclosing the optical system and the tracking device as well, a structure for supporting the housing and if required a means for converting the collected light energy into electrical or thermal energy.

19 Claims, 30 Drawing Figures

RADIATION ENERGY COLLECTION AND TRACKING APPARATUS

BACKGROUND OF THE INVENTION

The present invention relates to a novel apparatus for collecting the radiant energy such as light energy, and especially solar energy.

Extensive studies and experiments for utilization of solar radiation have been being made in order to solve the increasing energy problem, but the fact that the solar constant is as small as about one kilowatt per square meter presents very serious problems. In addition, it is impossible to convert the solar energy collected into other useful energies such as electricity or heat without conversion losses. Even when the sunlight collected is used for illumination without any conversion, there arises the problem of transmission losses. Furthermore, with the conventional solar energy collectors with a low efficiency, a huge sunlight collecting area must be provided. In addition, the sites for installation of such huge sunlight collectors are limited on the earth in view of climatic and geographic conditions.

Meanwhile there have been recently proposed various projects for underwater farms and ranches, and the use of sunlight at such underwater farms and ranches will attain very advantageous results in cultivation of various vegetables, animals and fish. If the sunlight collectors can be deployed in the sea immediately above the underwater farms and ranches, the problem of transmission losses will be overcome to a satisfactory degree. In addition, the problems encountered when the sunlight collectors are installed on the land will be also solved.

OBJECTS OF THE INVENTION

The primary object of the present invention is therefore to provide a light energy collection apparatus which can collect the low-energy-density solar energy with a high efficiency and transmit the collected solar energy to the desired places such as underwater farms and ranches through a transmission line of a short length with minimal transmission losses.

Another object of the present invention is to provide a tracking device which can normally maintain an optical system for collecting solar energy pointed at the sun, so that a high efficiency of collection of solar radiation can be attained.

A further object of the present invention is to provide a solar energy collection apparatus in which one or more solar energy collectors are normally kept pointed at the sun; but when wind gusts or the like exert excessive forces on them, the connection between the solar energy collectors and tracking device is released so that the breakdown of or damage to the solar energy collection apparatus can be avoided.

A further object of the present invention is to provide an automatic tracking device which enables the optical system to precisely follow the diurnal motion of the sun from sunrise to sunset throughout the four seasons.

A still further object of the present invention is to provide a device for precisely detecting the position of a light source or the sun so that the light or solar energy collection apparatus can precisely follow the motion of the light source or the diurnal motion of the sun.

A further object of the present invention is to provide an optical coupler which may couple one optical system to another with a minimum degree of transmission loss.

A yet further object of the present invention is to provide a light-guide cable with the input end capable of receiving the light rays with a minimum degree of transmission loss.

A still further object of the present invention is to provide a junction for connecting a light-guide cable end-to-end to another or for branching into a plurality of light guides.

The above and other objects, effects, features and advantages of the present invention will become more apparent from the following description of some preferred embodiments thereof taken in conjunction with the accompanying drawings.

DESCRIPTION OF THE PREFERRED EMBODIMENTS

Figure 1:
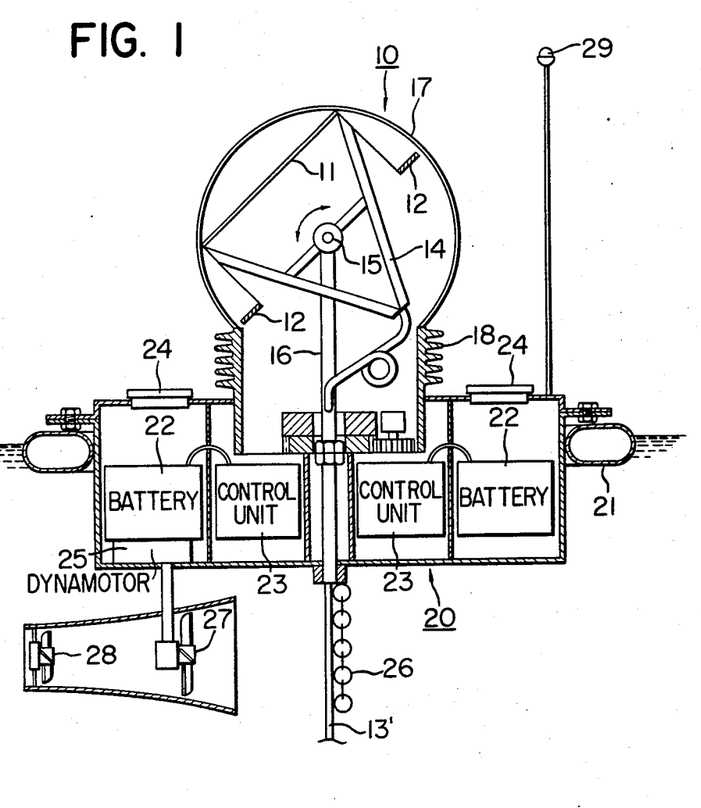
FIG. 1 is a vertical sectional view of a first embodiment of a solar energy collection apparatus in accordance with the present invention.

First Embodiment, FIG. 1

In FIG. 1 is shown a first embodiment of an apparatus for collecting solar energy in accordance with the present invention. The apparatus includes an optical system 10 for collecting the solar energy and a buoy 20 upon which is mounted the optical system 10. The optical system 10 comprises a lens 11 for focusing the solar energy, a photoelectric element 12 for converting the solar energy into electrical energy, a light-guide cable 13 for the transmission of the collected solar energy, a supporting framework 14 which supports the lens 11, the photoelectric element and the light-guide cable 13 and which is adapted to rotate about the horizontal and vertical axes 15 and 16 so as to keep both the lens 11 and the photoelectric element 12 pointed at the sun, a spherical casing or dome 17 which is made of a transparent material such as acrylic resins and which encloses therein the supporting framework 14 and a heat radiator 18 consisting of a plurality of fins.

In addition to the optical system 10, the buoy 20 carries batteries 22 and control units 23 and includes a ring-shaped float 21. The solar energy collection apparatus therefore may float in the sea water.

The supporting framework 14 is rotated about the horizontal and vertical axes 15 and 16 by the control units 23 so that the lens 11 and the photoelectric element 12 may be normally kept pointed at the sun as described elsewhere. The horizontal and vertical axes or shafts 15 and 16 which are mutually perpendicular are so arranged as to pass through the center of the spherical casing or dome 17, whereby the weights are balanced relative to the shafts 15 and 16 respectively and, consequently, a relatively small driving force is needed to keep the supporting framework 14 and hence the lens 11 and the photoelectric element 12 tracking the sun. It is preferable to seal nitrogen gas or the like in the spherical casing or dome 17 so as to prevent the overheating and the degradation of the components by oxidation in the dome 17.

The solar energy focused through the collection lens 11 at one end of the light-guide cable 13 is transmitted therethrough and through a light-guide cable 13' connected to the former to an underwater farm, ranch or the like. However, the buoy 20 which is floating in the sea water makes very complex motions, so that when the light-guide cables 13 and 13' are spliced in a conventional manner, the light-guide cable 13' is subjected to twising forces and is torn off. In order to prevent such accident, according to the present invention, the light-guide cables 13 and 13' are spliced through an optical-guide coupler 30. The coupler 30 receives and optically connects the light-guide cables 13 and 13' in such a way that the output end of the light-guide cable 13 and the input end of the light-guide cable 13' may be rotated with respect to each other about the extended axis of the vertical shaft 16. In addition, the buoy 20 is so arranged as to freely rotate about the light-guide cable 13'.

The solar energy is converted by the photoelectric element 12 into the electrical energy which is transmitted through lead wires and slip rings (not shown) to the batteries 22 to charge them. Because of this efficient charging of the batteries 22, they may supply the power for turning on a warning lamp 29 and driving the supporting framework 14 for a considerably long period of operation.

The buoy 20 further includes a dynamotor 25 and turbine wheels 27 and 28. When the turbine wheel 27 is rotated by the tidal wheels or the like, the dynamotor 24 generates electricity which in turn is charged into the batteries 22. When the buoy 20 is moved to another position, the dynamotor 25 is driven as a motor so as to drive the turbine wheel or screw 28. The buoy 20 further includes hatch covers 24 for inspection of batteries 22 and an anchor rope or the like 26 for securing the buoy 20.

As described above, according to the present invention, the solar energy which is collected through the lens 11 can be supplied in a very efficient manner through the light-guide cables 13 and 13' to an underwater farm, ranch or the like. In addition, the photoelectric element 12 can supply the power required for turning on the warning lamp 29 and driving the supporting frame 14 and the dynamotor 25. Furthermore, the optical system for collecting the solar energy is enclosed in the transparent spherical casing or dome 17, so that the contamination of the surfaces of the lens 11 and photoelectric element 12 can be avoided. Furthermore the surfaces of the transparent dome 17 are almost free from contamination so that the efficient collection of solar energy may be ensured. Moreover the weight of the collection lens 11 and the photoelectric element 12 is balanced symmetrically of the center of the spherical casing or dome 17; that is, the weight is distributed symmetrically about the horizontal and vertical shafts 15 and 16, so that the lens 11 and the photoelectric element 12 may be kept pointed at the sun with a minimum power. As a consequence, a long service life of the batteries 22 may be ensured and the solar energy may be collected over a long period of time without attendance of an operator. Since the buoy 20 can freely rotate about the light-guide cable 13' which is extended to an underwater farm, ranch or the like, the light-guide cable 13' may be prevented from being twisted and torn off even when the waves cause the irregular movements of the buoy 20.

Figure 2:
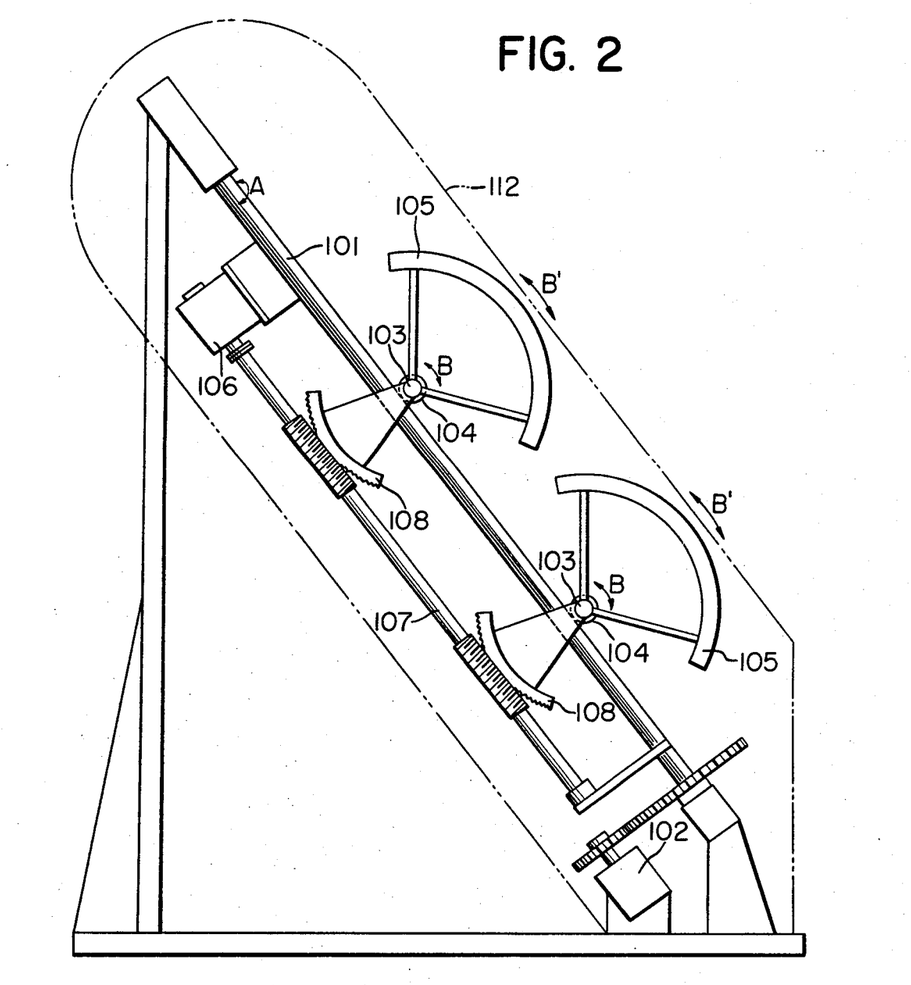
FIG. 2 is a side view of a second embodiment of the present invention.
Figure 3:
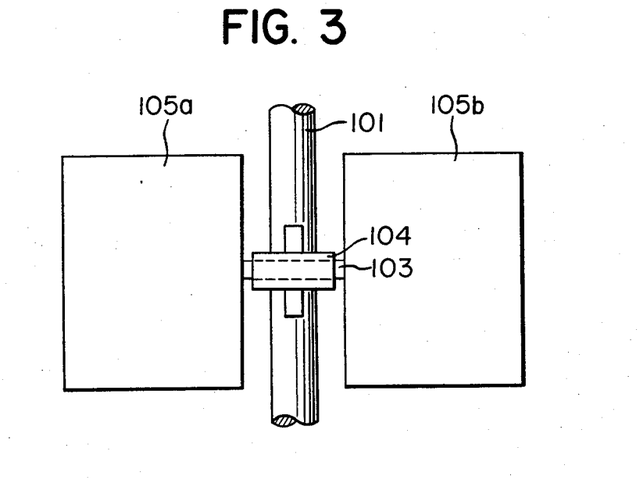
FIG. 3 is a top view of a solar energy collector of the solar energy collection apparatus shown in FIG. 2.
Figure 4:
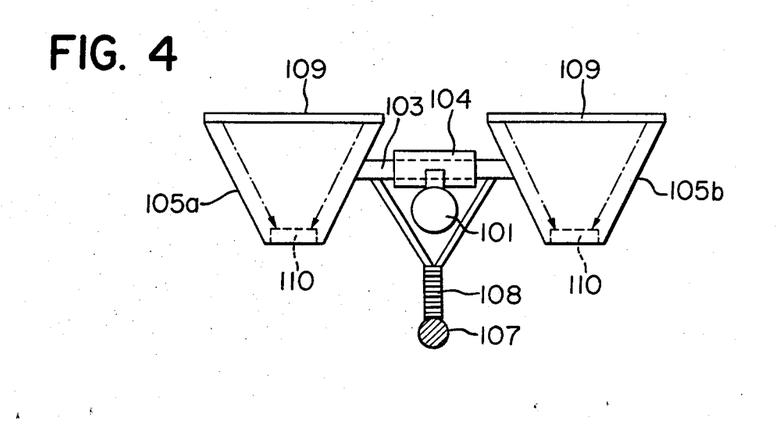
FIG. 4 is a front view thereof.

Second Embodiment, FIGS. 2, 3 and 4

In FIG. 2 is shown in perspective view a second embodiment of a sun tracking apparatus in accordance with the present invention. A main shaft 101 is rotated by a motor 102 in the directions indicated by a double-pointed arrow A, and a shaft 103 is rotatably supported by a bearing 104 at a right angle to the main shaft 101. A solar energy collector 105 is mounted on the shaft 103. Therefore as the shaft 103 is rotated in the directions indicated by a double-pointed arrow B, the solar energy collector 105 is also rotated in the same directions as indicated by a double-pointed arrow B'. A motor 106 which is mounted on the main shaft 101 has its drive shaft connected to a worm 107 which in turn is in engagement with a worm wheel 108 mounted on the shaft 103.

At the dawn, the motor 102 is driven so that the main shaft 101 is rotated in such a way that the solar energy collection apparatus may be directed to the direction in which the run rises above the horizon. As the sun rises, the motor 106 is driven so that the solar energy collectors 105 may be kept pointed at the sun. Therefore the most efficient collection of solar energy can be accomplished. As the sun moves, the rotations of the shafts 101 and 103 by the motors 102 and 106 are so controlled that the solar energy collectors 105 are kept pointed at the sun, whereby they can collect the solar energy under the most efficient condition.

In FIG. 3 is shown in top view one example of the solar energy collector 105 while in FIG. 4 is shown in front view the collector 105. The solar energy collector 105 consists of a plurality of solar energy collection units 105a and 105b which are mounted on the shaft 103 symmetrically of both the shafts 101 and 103 so that the turning moments acting on them may become minimum. Each solar energy collection unit 105a or 105b includes a lens 109 and a solar energy receiving member 110 located at the focal point of the lens 109.

Figure 5:
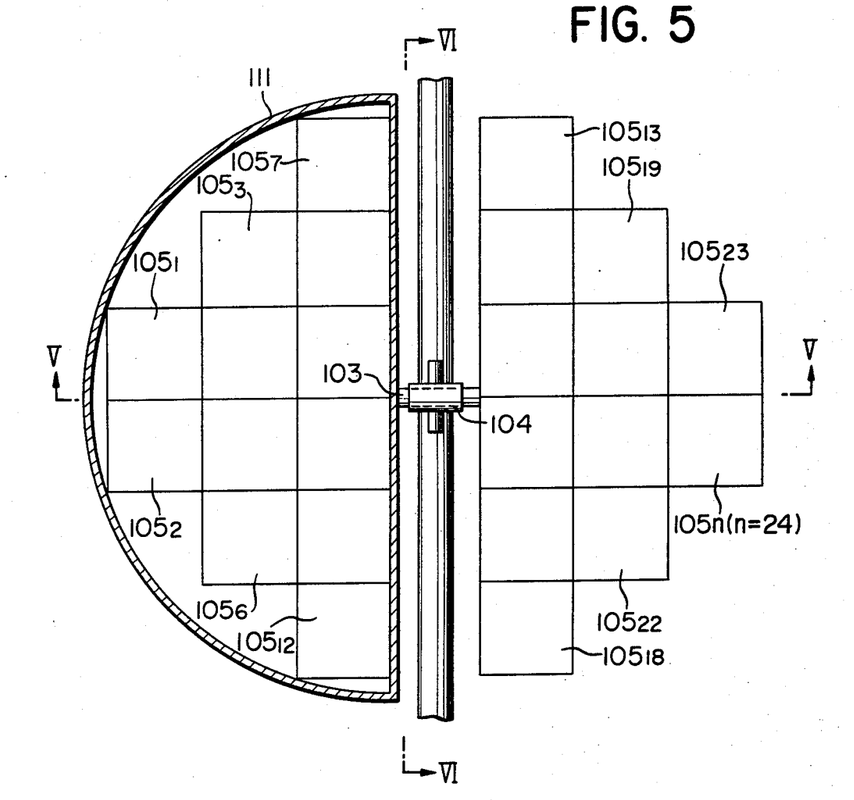
FIG. 5 is a top view of a third embodiment of the present invention.
Figure 6:
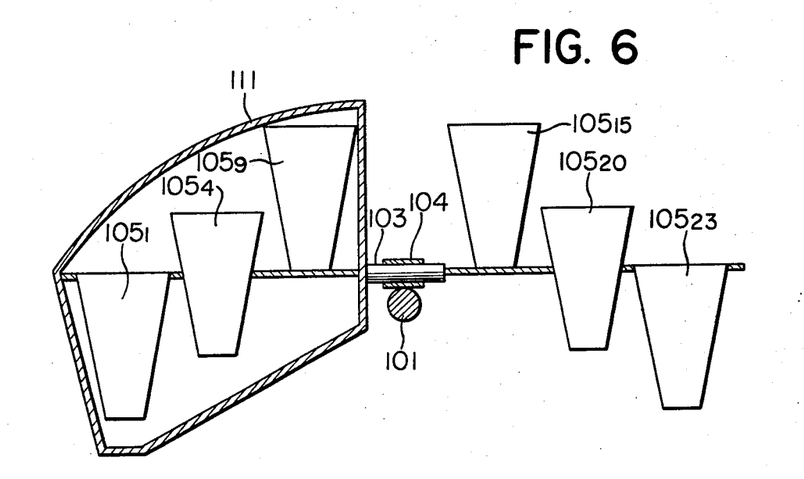
FIG. 6 is a side view looking in the direction indicated by the arrow V of FIG. 5.
Figure 7:
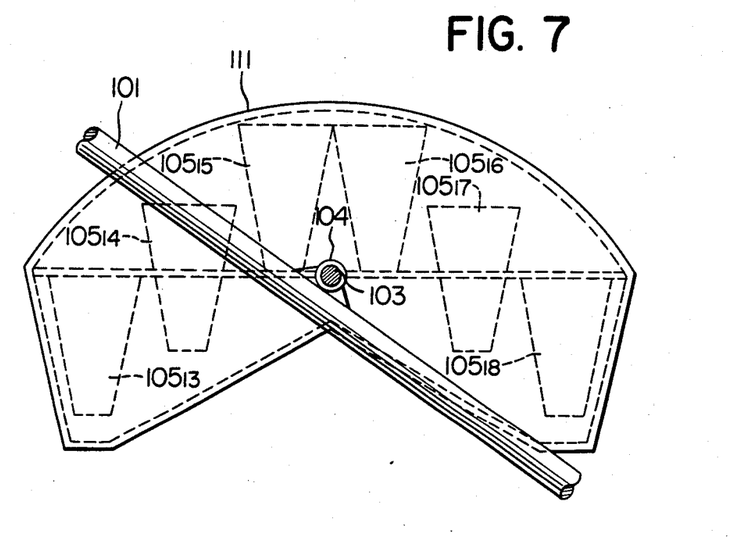
FIG. 7 is a side view looking in the direction indicated by the arrows VI of FIG. 5.

Third Embodiment, FIGS. 5, 6 and 7

In FIG. 5 is shown in top view a third embodiment of a solar energy collector in accordance with the present invention. FIG. 6 is a sectional view taken along the line V—V of FIG. 5 and FIG. 7 is a side view looking in the direction indicated by the arrow VI in FIG. 5. The solar energy collector consists of a plurality of solar energy collection units $105_l$ through $105_{n(n=24)}$ which are so arranged that their tops form roughy a partial spherical surface. In addition, the solar energy collection units $105_l$ through $105_n$ are so arranged that the center of gravity of the solar energy collector 105 coincides with the intersection between the shafts 101 and 103 so that the turning moments acting on the latter may become minimum. Furthermore the solar energy collection units $105_l$ through $105_n$ are arranged symmetrical about the axis of the shaft 101 so that the solar energy collector 105 may be rotated about the axis of the shaft 103 through a large angle; that is, the range of elevation angle becomes large.

Figure 8:
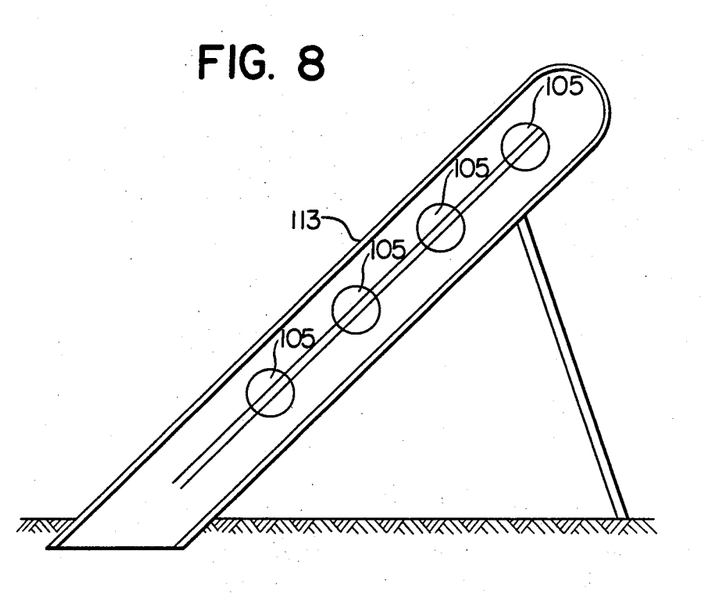
FIG. 8 is a schematic side view of a fourth embodiment of the present invention.

As shown at the left portion in FIGS. 5 through 7, the whole solar energy collection units $105_l$ through $105_n$ may be enclosed in a transparent casing 111. Alternatively, each solar energy collection unit $105_n$ may be sealed individually as indicated in the right portions in FIGS. 5 through 7. Furthermore the whole solar energy collector 105 may be contained in the transparent casing 112 as shown in FIG. 2. Furthermore the whole solar energy collection apparatus including the shafts 101 and 103, their associated components and the solar energy collector 105 may be contained in a suitable casing or housing 113 as shown in FIG. 8.

In the second and third embodiments, the solar energy collection units $105_n$ have been described as being elevated or rotated through the axis of the shaft 103 through the worm 107 and the worm wheel 108, but it is to be understood that any other suitable means may be employed. Furthermore it is to be understood to those skilled in the art that the main shaft 101 is so arranged as to control the elevation angle while the worm gearing or any other suitable means may be employed so as to control the azimuth when the solar energy collection apparatus is installed horizontally.

Figure 9:
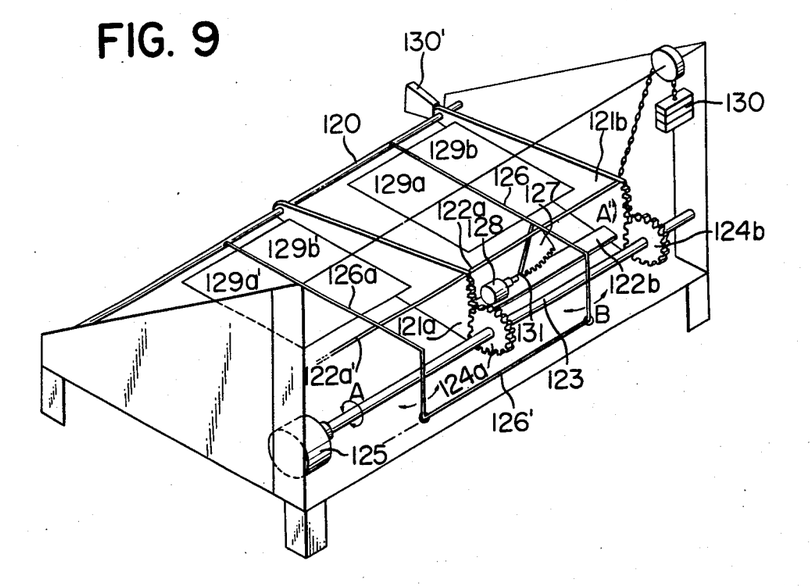
FIG. 9 is a perspective view of a fourth embodiment of the present invention.
Figure 10:
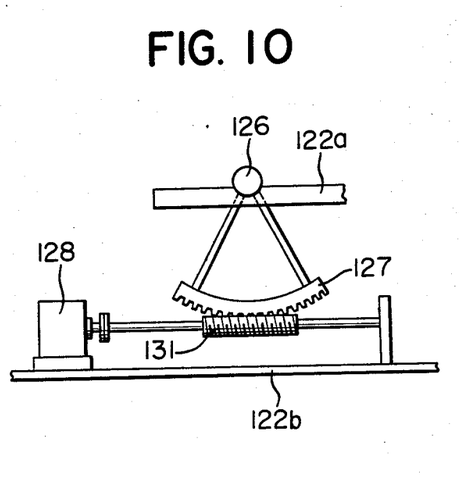
FIG. 10 is a partial front view, on enlarged scale, thereof showing the connection between a motor 128 and a shaft 126.

Fourth Embodiment, FIGS. 9 and 10

Sector gear pair 121a and 121b whose bases are rotatably carried by a shaft 120 are interconnected with shafts 122a and 122b and are in mesh with gears 124a and 124b, respectively, carried by a shaft 123 which in turn is rotated in the direction indicated by a double-pointed arrow A in FIG. 9 by a motor 125. Therefore when the shaft 123 is rotated in the clockwise direction in FIG. 9, the sector gears 121a and 121b are rotated in the counterclockwise direction, and vice versa as indicated by the double-pointed arrow A' in FIG. 9.

A shaft 126 whose one end is rotatably supported by the shaft 120 is rotatably supported by the connecting rod 122a as best shown in FIG. 10. A sector gear 127 whose base is securely attached to the shaft 126 is in mesh with a worm 131 driven by a motor 128 which in turn is mounted on the lower connecting rod 122b as best shown in FIG. 10. The shaft 126 carries solar energy collection units 129a and 129b. Reference numerals 130 and 130' denote counterweights.

As the azimuth and elevation of the sun change, the motors 128 and 125 are so driven that the solar energy collector 129 may be rotated about the axes of the shaft 126 and 120 so as to follow the diurnal motion of the sun.

The rotation of the shaft 126 can be transmitted through a shaft or connecting rod 126' to a shaft 126a which is similar in construction and arrangement with the shaft 126 and carries solar energy collection units 129'a and 129'b so that all the solar energy collection units 129 may be angularly controlled simultaneously. It is apparent to those skilled in the art that in this manner the number of solar energy collection units may be increased to as many as desired.

With the solar energy collection apparatus described above with reference to FIGS. 9 and 10, efficient solar energy collection may be carried out from sunrise to sunset.

Figure 11:
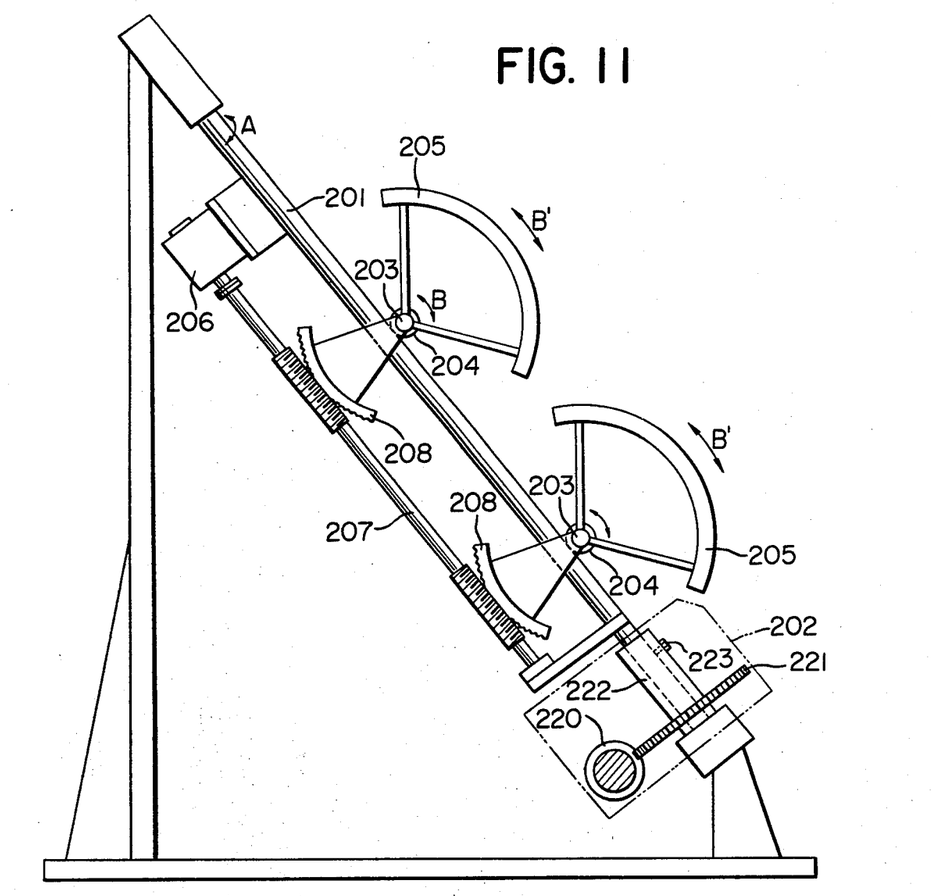
FIG. 11 is a side view of a fifth embodiment of the present invention.
Figure 12:
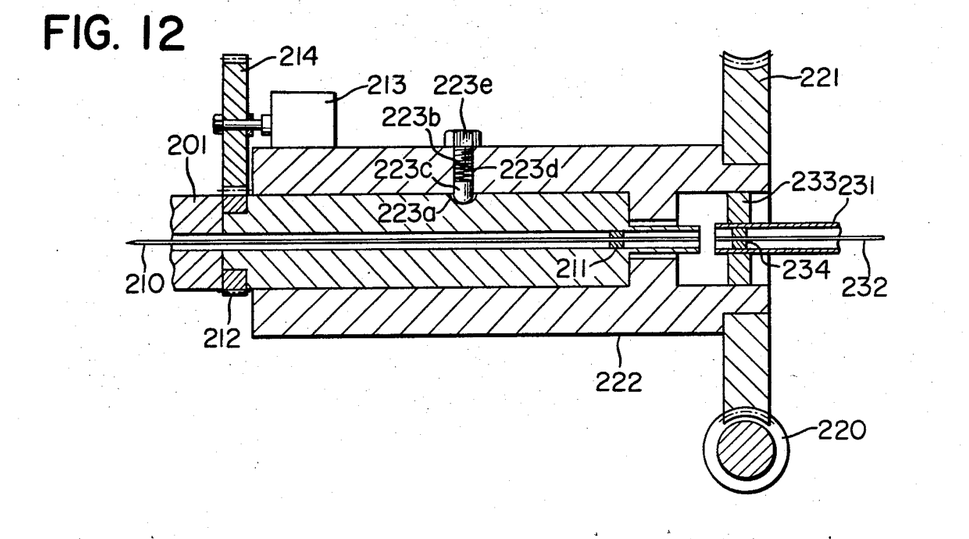
FIG. 12 is a partial axial sectional view, on enlarged scale, thereof showing the connection between a main shaft 201 and a driving motor (not shown) for driving the same.

Fifth Embodiment, FIGS. 11 and 12

A fifth embodiment of the present invention will be described below with reference to FIGS. 11 and 12. A main shaft 201 is so arranged as to rotate in the direction indicated by the double-pointed arrow A in FIG. 11 by a driving device 202 which, as will be described in more detail with particular reference to FIG. 12, comprises a worm 220 driven by a motor or the like (not shown), a worm wheel 221 in mesh with the gear 220, a sleeve 222 integral with the worm wheel 221 and a torque limiter 223 between the main shaft 201 and the sleeve 222.

A shaft 203 is rotatably mounted in a bearing 204 which in turn is mounted on the main shaft 201 at a right angle. A solar energy collector 205 is carried by the elevation shaft 203. A sector gear 208 which is carried by the shaft 203 is in mesh with a worm 207 which in turn is driven by a motor 206 mounted on the main shaft 201. Therefore, upon rotation of the motor 206, the shaft 203 rotates in the direction indicated by the double-pointed arrow B so that the solar energy collector 205 is also rotated in the same direction as indicated by the double-pointed arrow B'.

At sunrise the motor (not shown) is driven to drive the worm 220, thereby rotating the main shaft 201 so as to point the solar energy collector 205 in the direction in which the sun rises. As the azimuth and altitude of the sun change during its diurnal motion, the motors are so driven that the solar energy collectors 205 may precisely follow the diurnal motion of the sun from sunrise to sunset, whereby the very efficient collection of solar energy may be accomplished.

In this embodiment, the worm gearing is employed so that no torque will not be transmitted from the main shaft 201 and the worm 207 to their associated driving devices such as motors. In addition, a safety device such as a torque limiter is interposed between the main shaft 201 and the driving device 202 so that when excessive torques are exerted to the solar energy collection apparatus due to gusts or the like, the safety device may release the main shaft 201 from the driving device 202.

Referring to FIG. 12, the rotation of the motor (not shown) in transmitted to the main shaft 201 through the worm 220, the worm wheel 221, the sleeve 222 extended from the worm wheel 221 coaxially thereof and the torque limiter 223 interposed between the sleeve 222 and the main shaft 201. Therefore, the rotation of the main shaft 201 is not transmitted through the worm gearing to the driving motor (not shown) so that the stable operation of the solar energy collection apparatus may be ensured.

The use of the worm gearing ensures the stable operation of the solar energy collection apparatus so that the solar energy collection apparatus may be kept pointed at the sun in a stable manner. However, when excessive forces act on the solar energy collection apparatus due to gusts or the like, the connections or joints between the solar energy collectors 205 and the worm 220 are broken if there are not provided suitable shock absorbing means or the like. The torque limiter 223 is provided in order to prevent such breakdowns as described above. That is, when the excessive forces act on the solar energy apparatus, the connection or joint between the main shaft 201 and the worm gearing may be released.

Referring to FIG. 12, an engaging means such as a pin $223_c$ is inserted into a tapped hole $223_b$ formed through the cylindrical wall of the sleeve 222 and a recess $223_a$ formed in the cylindrical surface of the main shaft 201. Thereafter a coiled spring $223_d$ is inserted into the tapped hole $223_b$ and then a screw $223_e$ is screwed into the tapped hole $223_b$. Therefore the sleeve 222 and the main shaft 201 are joined normally with the pin $223_c$, whereby the rotation of the sleeve 222 is transmitted to the main shaft 201. However when excessive forces act on the solar energy collection apparatus due to gusts or the like, excessive turning moments are exerted to the main shaft 201. Then the pin $223_c$ is forced to be pulled out of the recess $223_a$ and pushed into the tapped hole $223_b$ against the coiled spring $223_d$, whereby the connection between the main shaft 201 and the sleeve 222 is released and, consequently, the main shaft can freely rotate relative to the sleeve 222. Thus the solar energy collection apparatus can be protected against breakdowns due to gusts or the like.

The rotation of the sleeve 222, which is connected through the worm gearing to the driving motor (not shown), is controlled by a programmed timing device such as a microcomputer (not shown) in such a way that the solar energy collectors 205 may follow the diurnal motion of the sun from sunrise to sunset. However, when the connection between the main shaft 201 and the sleeve 222 is released as described above, the solar energy collectors 205 cannot be pointed at the sun. Therefore in order to re-establish the driving connection between the main shaft 201 and the sleeve 222, the present invention provides a motor 213. The drive shaft of the motor 213 carries a gear 214 which is in mesh with a gear 212 mounted on the main shaft 201. After the gust is over, the motor 213 is driven so that the main shaft 201 is rotated. Then the pin $223_c$ which is pressed against the cylindrical surface of the main shaft 201 under the force of the coiled spring $223_d$ drops into the recess $223_a$ so that the driving connection between the main shaft 201 and the sleeve 222 or the worm gearing may be re-established. Then the motor 213 is stopped. In this case, the motor 213 may be manually controlled or automatically controlled in response to the signal from a suitable sensor means for sensing the angular position of the main shaft 201 relative to the sleeve 222, the displacement of the pin $223_c$ or the elastic distortion of the coiled spring $223_d$.

The solar energy collected by the solar energy collectors 205 is transmitted through a light-guide cable or an optical fiber 210 extended through the main shaft 201 and supported by a supporting member 211. A light-guide cable or the like 232 is extended through a pipe 231 coaxially thereof and supported by a supporting member 234. Therefore the light-guide cables 210 and 232 can be optionally coupled in a very simple manner and the efficient and simple transmission of the solar energy from the light-guide cable 210 to the light-guide cable 232 may be ensured. When the solar energy collected by the collectors 205 is once converted into electrical energy in the solar energy collection apparatus, instead of the light-guide cables 210 and 232, the electrical conductors or cables are employed. In this case when they are extended in a manner substantially similar to that described above, they may be spliced together in a very simple manner.

As described above, according to the fifth embodiment of the present invention, the main shaft 201 of the solar energy collection apparatus is driven through the worm gearing. As a result, the transmission of rotation in the opposite direction; that is, from the main shaft 201 to the driving motor (not shown) can be avoided so that the solar energy collectors 205 may follow the diurnal motion of the sun in a very stable manner. In addition, the torque limiter is interposed between the worm gearing and the main shaft 201, so that even when the excessive forces suddenly act on the solar energy collection apparatus due to gusts or the like, the torque limiter 223 can release the driving connection between the worm gearing and the main shaft 201 and, consequently, the breakdowns of the tracking or driving device can be avoided. Furthermore when the gust is over, the driving connection between them can be immediately established again so that the tracking can be started again.

Sixth Embodiment, FIGS. 13 through 17

According to a sixth embodiment to be described in detail below with reference to FIGS. 13 through 17, the lens or lens system for collecting the solar energy can follow the diurnal motion of the sun in such a way that the most efficient solar energy collection can be attained. However, it is apparent to those skilled in the art that the sixth embodiment can track not only the sun but also other celestial bodies such as the moon and objects which reflect back the light.

Figure 13:
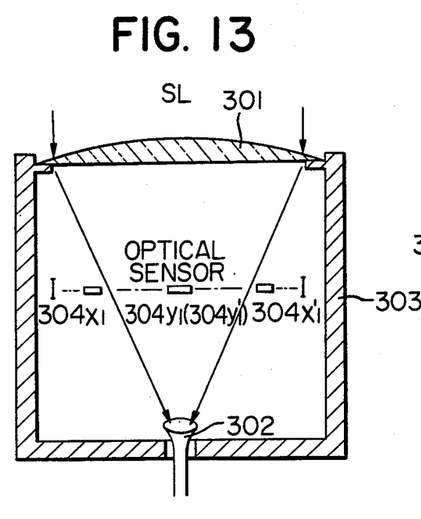
FIG. 13 is a sectional view of a sixth embodiment of the present invention or more particularly an automatic tracking device.

Referring first to FIG. 13, the solar energy SL is collected through a lens such as Fresnel lens 301 and focused upon the input end of a light-guide cable, a photoelectric element or a photothermal element. For instance, the collected solar energy is transmitted through the light-guide cable to a desired location where it is used for illumination or it is converted into other useful energies such as electrical or thermal energy.

The lens 301, the solar energy input means 302 and optical sensors $304_{x1}$, $304_{x1}'$, $304_{y1}$ and $304_{y1}'$ to be described in detail below are mounted on a supporting framework or the like 303 which in turn is driven so as to follow the diurnal motion of the sun by a tracking device (not shown).

In order to make the solar energy collection apparatus or collector follow the diurnal motion of the sun, there has been proposed a system in which in response to the output from a solar energy sensor, the whole solar energy collection apparatus; that is, the supporting framework 303 in this embodiment is made to follow the diurnal motion of the sun. However this system has a distinct defect in that once the interception of the sun light by the solar energy sensor is interrupted by clouds, the tracking is interrupted and it becomes extremely difficult to have the solar energy collection apparatus to track the sun again. In order to overcome this defect, there has been also proposed a system in which based upon the predicted diurnal motion of the sun, a timing device controls the tracking of the solar energy collection apparatus or the supporting frame 303. But this system also has a defect that whether or not the solar energy collected through the lens 301 is focused on the solar energy input means 302 cannot be detected. As a result, the tracking continues with the collected solar energy not focused on the solar energy input means 302 in the worst case.

The present invention was made in order to overcome the above and other problems and defects encountered in the prior art tracking systems.

Figure 14:
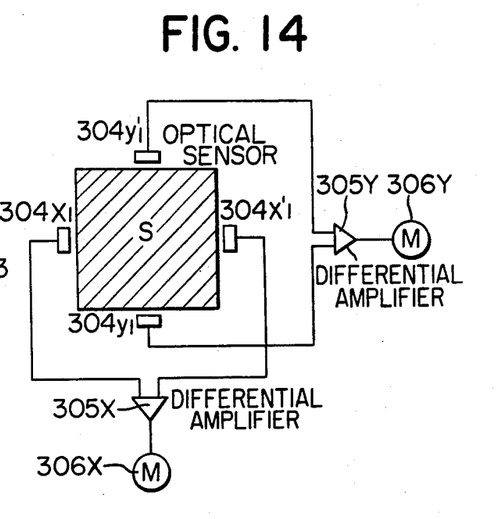
FIG. 14 is a sectional view taken along the line I—I of FIG. 13.

Referring further to FIG. 14, at least one pair or preferably two pairs of optical sensors $304_{x1}$ through $304_{y1}'$ are positioned around the coverging square prism S of the solar energy (when the angle of incidence is zero) and symmetrically about the axis of the lens 301 between the same and the solar energy input means 302.

Figure 15:
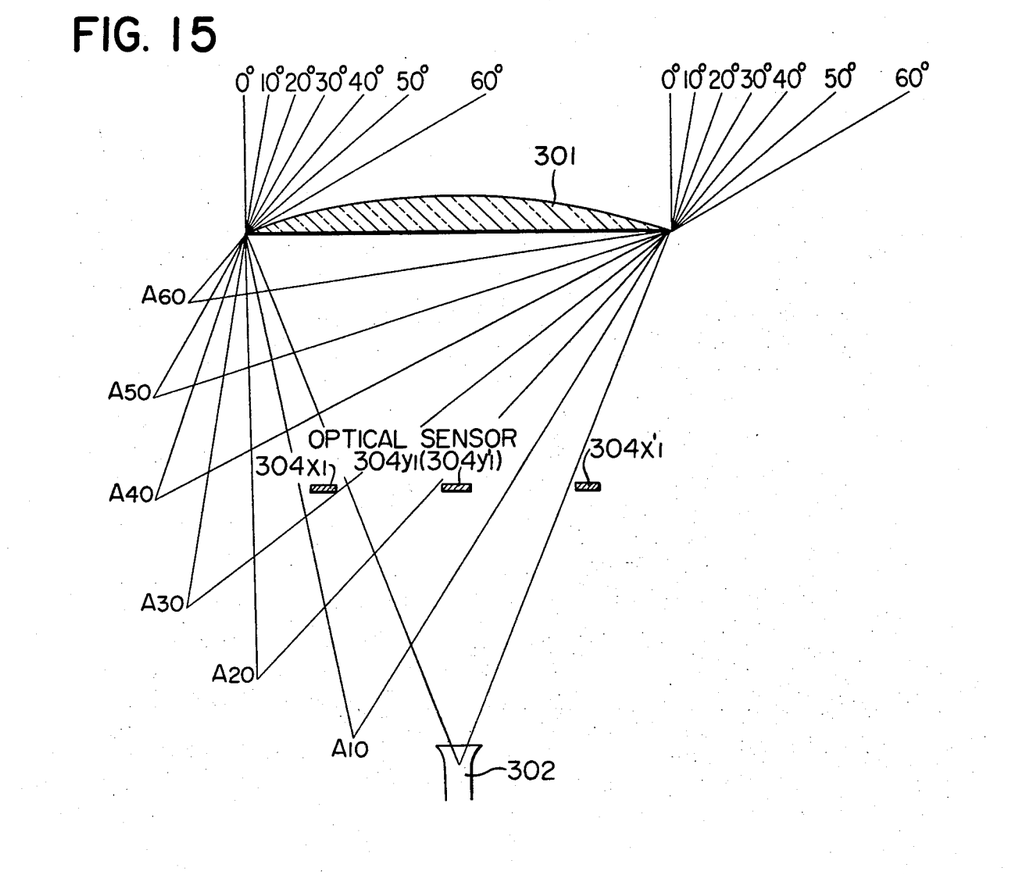
FIG. 15 is a diagram used for the explanation of the underlying principle of the automatic tracking device shown in FIGS. 13 and 14.

In FIG. 15 is shown the relationship between the angle of incidence of the solar energy or the sun light falling on the lens 301 and the position at which the collected solar energy is focused. As is well known to those skilled in the art of solar energy technology, when and only when the angle of incidence is 0°, the image of the sun is sharply focused at the solar energy input end 302. However, as the angle of incidence varies, the point at which the solar energy is focused (to be referred to as "the focused point" in this specification) deviates from the solar energy input means 302. For instance, when the incidence angle is 30°, the focused point is at $A_{30}$ and the focused point is moved to the point $A_{60}$ when the angle of incidence becomes 60°.

Therefore, when the optical sensors 304 are located as shown, the optical sensor $304_{x1}$ can intercept the light when the angle of incidence is between 0° and 30° while no light falls on the optical sensor $304_{x1}'$. The outputs from these sensors $304_{x1}$ and $304_{x1}'$ are applied to a differential amplifier $305_x$ (See FIG. 14) and in response to the output from the amplifier $305_x$ a servomotor $306_x$ is driven so that the supporting framework 303 may be pointed at the sun. Then the outputs from the optical sensors $304_{x1}$ and $304_{x1}'$ become equal in level so that no output signal is derived from the differential amplifier $306_x$ and, consequently, the servomotor $306_x$ is stopped. In other words, the servomotor $306_x$ is so driven that the outputs from the optical sensors $304_{x1}$ and $304_{x1}'$ and may become equal in level and, consequently, the framework 303 may be always kept pointed at the sun. As a result, the efficient collection of solar energy may be ensured.

When the sun is shadowed by clouds, the quantities of the light incident on both the optical sensors $304_{x1}$ and $304_{x1}'$ are equal so that the tracking is suspended in a stable manner. When the sun is exposed again and the angle of incidence is within 30°, one of the optical sensors $304_{x1}$ and $304_{x1}'$ receives the light while the other does not so that the servomotor $306_x$ is driven again in such a way that the difference in output between the optical sensors $304_{x1}$ and $304_{x1}'$ becomes zero.

So far the optical sensors 304 have been described as being positioned adjacent to the square pyramid of the solar energy converging toward the solar energy input means 302 as best shown in FIG. 14, but it is apparent to those skilled in the art that they may be located within the pyramid S or on the boundaries thereof. When the optical sensors 304 are positioned as shown in FIG. 14, the servomotor $306_x$ is so driven that no light falls upon the optical sensors $304_{x1}$ and $304_{x1}'$ as described above and, consequently, they may be prevented from being damaged or burned by the solar energy. The optical sensors $304_{x1}$ and $304_{x1}'$ may be interposed at any positions between the lens 301 and the solar energy input means 302 as long as their positions are adjacent to the boundaries of the pyramid of the solar energy converging toward the solar energy input means 302. In general, the closer they are located toward the lens 301, the larger the range for detecting the position of the sun becomes so that the solar energy collection apparatus may precisely follow the diurnal motion of the sun. On the other hand, the closer the positions of the optical sensors 304 toward the solar energy input means 302, the narrower the sun position detection range becomes, but the solar energy collection apparatus can follow the diurnal motion of the sun more precisely. As is apparent from the above description, the pair of optical sensors $304_{x1}$ and $304_{x1}'$ are used to track the sun the azimuthal direction and the provision of another pair of optical sensors $304_{y1}$ and $304_{y1}'$, which are positioned symmetrically about the line connecting the optical sensors $304_{x1}$ and $304_{x1}'$, enables the solar energy collection apparatus to follow the altitude of the sun. Thus, the solar energy collection apparatus can precisely follow the diurnal motion of the sun from sunrise to sunset throughout the seasons.

Figure 16:
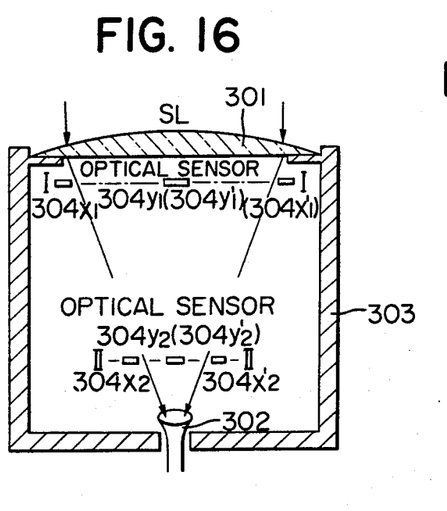
FIG. 16 is a sectional view of a seventh embodiment of the present invention.
Figure 17:
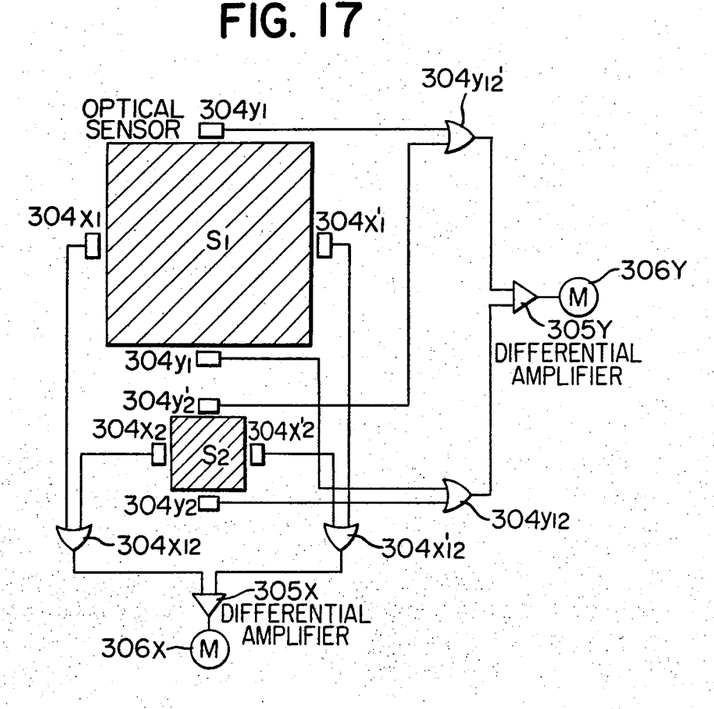
FIG. 17 shows on the same plane both the cross sections taken along the lines I—I and II—II of FIG. 16.

Seventh Embodiment, FIGS. 16 and 17

A seventh embodiment shown in FIGS. 16 and 17 is substantially similar in construction to the sixth embodiment described above with reference to FIGS. 13, 14 and 15 except that an upper array of optical sensors $304_{x1}$ through $304_{y1}'$ and a lower array of optical sensors $304_{x2}$ through $304_{y2}'$ are provided. The arrangement of the upper and lower optical sensor arrays is substantially similar to that of the sixth embodiment, and the upper array is located in the plane indicated by the line I—I of FIG. 16 while the lower array in the plane indicated by the line II—II of FIG. 16. The cross sections of the pyramid of the solar energy converging toward the solar energy input means 302 which cross sections are taken on these planes are indicated by $S_1$ and $S_2$, respectively, in FIG. 17.

The outputs of the optical sensors $304_{x1}$ and $304_{x2}$ are applied to the inputs of an OR gate $304_{x12}$ while the outputs of the optical sensors $304_{x1}'$ and $304_{x2}'$ to the inputs of an OR gate $304_{x12}'$. The outputs of OR gates $304_{x12}$ and $304_{x12}'$ are applied to the inputs of the differential amplifier $305_x$. In like manner, the outputs of the optical sensors $304_{y1}$ and $304_{y2}'$ are applied to an OR gate $304_{y12}'$ while the outputs of the optical sensors $304_{y1}$ and $304_{y2}$ to an OR gate $304_{y12}$. The outputs of OR gates $304_{y12}$ and $304_{y12}'$ are applied to the inputs of the differential amplifier 305Y. As with the sixth embodiment, the servomotors 306X and 306Y are driven in response to the outputs, respectively, from the differential amplifiers 305X and 305Y.

Therefore in response to the outputs from the optical sensors in the upper array, the rough tracking is accomplished while in response to the outputs from the optical sensors in the lower array the fine tracking is accomplished, whereby the solar energy collection apparatus precisely follow the diurnal motion of the sun.

Since the optical sensors 304 in the lower array are located closer to the lens 301, the light of high intensity falls upon them so that the burning of the optical sensors tends to occur. Therefore in order to protect them, suitable heat shielding or absorbing means or optical filters are positioned in front of them. With this arrangement, it becomes possible to use the optical sensors all of the same construction and made of the same materials.

In FIG. 17 the outputs of the optical sensors $304_{x1}$ and $304_{x2}$; that is, the optical sensors in the upper and lower arrays but on the same side are shown as being applied through OR gate $304_{x12}$ to one input of the differential amplifier 305X while the outputs of the optical sensors $304_{x1}'$ and $304_{x2}'$ to the other input of the amplifier 305X through OR gate $304_{x12}'$, but it is understood that the signal representative of the difference in output between the optical sensors $304_{x1}$ and $304_{x1}'$ in the same or upper array may be derived by a first differential amplifier and applied to an OR gate while, in like manner, the difference in output between the optical sensors $304_{x2}$ and $304_{x2}'$ in the same lower array may be derived by a second differential amplifier and applied to the same OR gate and that in response to the output from this OR gate the servomotor 306X may be driven. Same is true for the tracking sub-system including the optical sensors $304_y$ for tracking the altitude of the sun.

So far the seventh embodiment has been described as following the diurnal motion of the sun, but it is to be understood that the seventh embodiment may be used for tracking an object which makes irregular motions.

As described above, the automatic tracking device described above with reference to FIGS. 16 and 17 can easily track any object which emits or reflects light and moves or travels in a very wide range. For instance, even when the automatic tracking device fails to track a light-emitting object which makes very irregular motion, it can immediately detect the object and resume the automatic tracking. Therefore the advantages of the automatic tracking device are pronounced especially when it is installed on a buoy or the like which makes very irregular motions because of wave motions.

Figure 18:
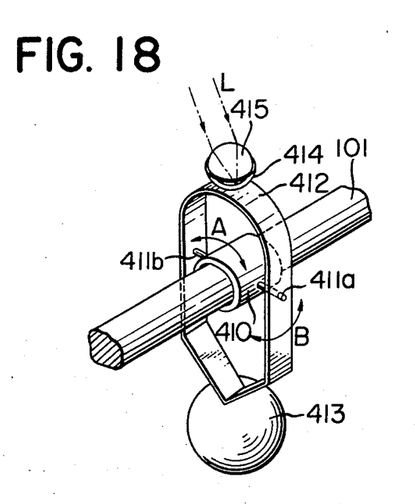
FIG. 18 is a perspective view of an eighth embodiment of the present invention or more specifically a device for detecting the position of the sun.

Eighth Embodiment, FIG. 18

In the case of the solar energy collection apparatus of the type shown in FIG. 2, there must be provided a system for correctly detecting the position of the sun so as to control the azimuth and altitude or elevation motors 102 and 106, thereby keeping the solar energy collection apparatus pointed at the sun. The eighth embodiment of the present invention relates to such system as described above.

Referring to FIG. 18, a ring 410 is fitted over the main shaft 101 (See FIG. 2) for rotation in the directions indicated by the double-pointed arrow A. A yoke 412 made of a strip-like material is pivoted to the ring 410 with pins or arms 411a and 411b for rotation in the directions indicated by the double-pointed arrow B. The lower portions of the arms of the yoke 412 are bent inwardly and a weight 413 is securely attached to the lower ends of the arms which are joined. As a result, regardless of the rotation and angle of inclination of the main shaft 101, the yoke 412 is normally maintained vertically.

A socket 414 is attached at the top of the yoke 412 and receives a spherical lens 415. A matrix array of optical sensors such as photo-cell is mounted on the upper surface of the socket 414 or the lower semispherical surface of the spherical lens 415. The position of the optical sensor which is turned on is dependent upon the position of the sun so that the position of the sun can be detected in terms of the position of the optical sensor which is turned on.

As described above, according to the eighth embodiment of the present invention, the position of the sun can be detected precisely so that the solar energy collection apparatus may precisely follow the diurnal motion of the sun and, consequently, the efficient solar energy collection may be ensured.

Figure 19:
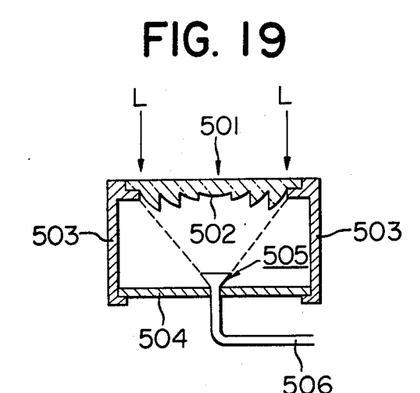
FIG. 19 is a sectional view of a ninth embodiment of the present invention.
Figure 20:
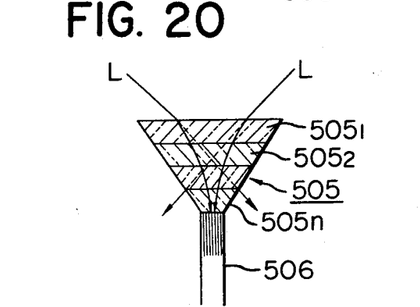
FIG. 20 is a longitudinal sectional view of an optical coupler used in the solar energy collector shown in FIG. 19.

Ninth Embodiment, FIGS. 19 and 20

In FIG. 19 is shown in section a ninth embodiment of a solar energy collector in accordance with the present invention. In general, the solar energy collector 501 comprises a lens 501 for collecting the solar energy L, a supporting framework or lens barrel 503 for supporting the lens 502, a bottom plate 504 and an optical coupler 505 at which is converged or focused the solar energy and from which the collected solar energy is transmitted through a light-guide cable 506. Of these components the present invention relates particularly to the construction of the optical coupler 505 which enables the solar energy that is collected through the lens 502 to enter the light-guide cable 506 in an efficient manner.

In FIG. 20 is shown in cross section and on enlarged scale the optical coupler 505 which, in general, comprises a plurality of light transmission members or layers $505_1$ through $505_n$ having different refractive indexes. These light transmission members or layers $505_1$ are laminated or stacked from the top to the bottom in the order to refractive indexes. That is, the top transmission member or layer $505_1$ has the smallest refractive index; the next light transmission member or layer $505_2$ has the next smallest refractive index and so on and finally the bottom or lowermost light transmission member $505_n$ has the greatest refractive index. As a result, the solar energy focused at the top surface of the optical coupler 505 is further converged toward the axis of the optical coupler 505 as indicated by the solid lines in FIG. 20 and finally enters the light-guide cable 506 at an optimum angle with respect to the axis thereof.

When the optical coupler were made of a single light transmission member; that is, when the refractive index of the optical coupler were same, part of the solar energy falling on it would travel as indicated by the dotted line and would not be directed toward the inlet end of the light-guide cable 506, resulting in a considerable degree of transmission or coupling loss.

Instead of laying the light transmission members or layers one upon another as shown in FIG. 20, an optical coupler may be made of a single light transmission member in which a refractive-index gradient along the axis is so selected that the solar energy may be gradually converged toward the input end of the light-guide cable 506 and enter into it at an optimum angle with respect to the axis thereof. Alternatively, a plurality of light transmission members having different refractive-index gradients may be overlayed one upon another. Furthermore, a plurality of optical couplers of the types described above may be coupled in series.

As described above, according to the ninth embodiment or the optical coupler in accordance with the present invention, the collected solar energy may be fed into the light-guide cable 506 in a very efficient manner.

Figure 21:
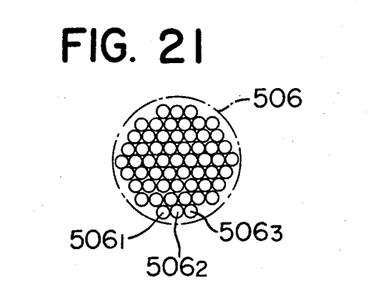
FIG. 21 is a cross sectional view of a prior art or conventional light-guide cable.

Prior Art Light-Guide Cable, FIG. 21

In FIG. 21 is shown in cross section of a conventional light-guide cable consisting of a plurality of optical fibers $506_1$ through $506_n$ circular in cross section. Therefore when the light-guide cable 506 is coupled to the optical coupler of the type shown in FIG. 19, the solar energy also enters the spaces between the optical fibers $506_1$ through $506_n$ and between them and the cladding, resulting in the loss of collected solar energy. The dead space between the optical fibers and between them and the cladding is dependent upon the thickness of the cladding and becomes as high as about 30% of the cross sectional area of the light-guide cable 506.

Figure 22:
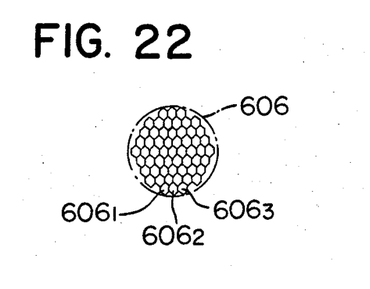
FIG. 22 is a sectional view of the input end of a light-guide cable in accordance with the present invention.

Tenth Embodiment, FIG. 22

A tenth embodiment of the present invention which was made to overcome the above problem will be described in detail with reference to FIG. 22. The cladding of the light-guide cable 606 is removed a predetermined length from the input end of the cable 606 so as to expose the optical fibers $606_1$ through $606_n$ hexagonal in cross section and stranded also hexagonal in cross section. As a result, when the input end of the light-guide cable 606 is optically coupled to the optical coupler 505 of the type shown in FIG. 20, no transmission loss occurs between them because there exists no dead space between the optical fibers and between them and the cladding.

In order to remove the cladding and to make the optical fibers $606_1$ through $606_n$ to have a hexagonal cross section, the cladding adjacent to the input end of the light-guide cable 606 is heated and melted to such a degree that the exposed optical fibers may not be melted. Thereafter a suitable jig or wire is applied to the heated end of the light-guide cable 606 in such a way that the softend or melted cladding may be removed and the exposed strand of optical fibers may be forcibly shaped to have a hexagonal cross section. As a consequence the individual optical fibers are forced to reduce its circular cross section to a substantially hexagonal cross section and are forced into very intimate contact with each other.

So far the solar energy collected through the lens 502 has been described as being fed into the light-guide cable 606 through the optical coupler 505, but it is to be understood that the solar energy may be directly focused through the lens 502 at the input end of the light-guide cable 606. In addition, the optical coupler 505 may be used for optically splicing the light-guide cables or the like.

As described above, according to the tenth embodiment of the present invention, by the simple end preparation consisting of the steps of removing the cladding of the light-guide cable 606 a predetermined length from the input end thereof and molding the exposed optical fibers into a hexagonal cross section, the solar energy collected through the lens 502 can be fed through the optical coupler 505 into the light-guide cable 606 in a very efficient manner. In addition, the end-to-end connection between the light-guide cables can be accomplished in a very efficient manner.

Joints for Light-Guide Cables for End-to-End Connection or Branching, FIGS. 23 through 30

When the light-guide cables are joined for end-to-end connections or branching with the use of conventional connectors or couplers and splitters in order to give certain desired properties to the network of light-guide cables and other components, considerable degrees of transmission losses occur in the connectors or couplers and splitters. Some embodiments to be described below with particular reference to FIG. 23 through 30 relate to the improvements of the joints for light guides which may facilitate the end-to-end connection between the light-guide cables and the branching or splitting of the light-guide cables and which may reduce the transmission losses at the joints to a negligible degree.

Figure 23:
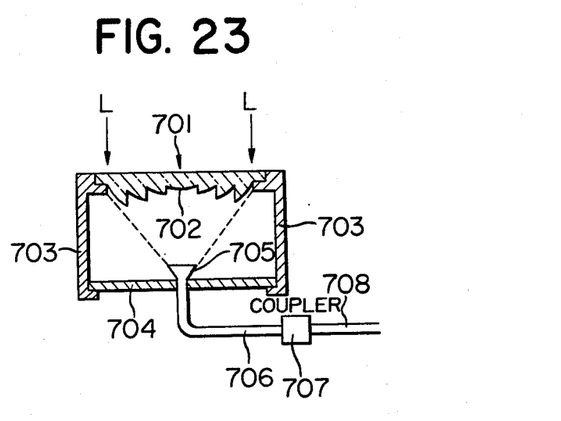
FIG. 23 is a layout of light-guide cables connected in accordance with the present invention.

In FIG. 23 is shown a layout of light-guide cables in accordance with the present invention. The solar energy L collected by a solar energy collector generally indicated by the reference numeral 701 is transmitted through a light-guide network to desired locations where the solar energy is used for, for instance, illumination. As described elsewhere, the solar energy collector 701 comprises a lens 702, a framework 703 and a bottom plate 704 for supporting the lens 702 and an optical coupler 705 for entering the collected solar energy into a light-guide cable 706 which may be directly extended to a desired remote place or which may be connected through a connector or coupler 707 end-to-end to another light-guide cable 708 or, even though not shown, may be splitted into a plurality of branches.

When the light-guide cables 706 and 708 are connected through the connector or coupler 707, the alignment between them is very difficult because the conventional light-guide cables have, in general, a circular cross section. Furthermore with the conventional connector or coupler, a considerably higher degree of transmission losses results. In order to solve these problems, the present invention teaches to process the ends of the light-guide cables to be coupled in the manner described above with reference to FIG. 22. However, it is still difficult to reduce the transmission losses to a negligible degree. Furthermore, it is difficult to connect one light-guide cable to a plurality of light-guide cables at the same joint. The present invention may substantially overcome these problems as will become apparent from the following description.

Figure 24:
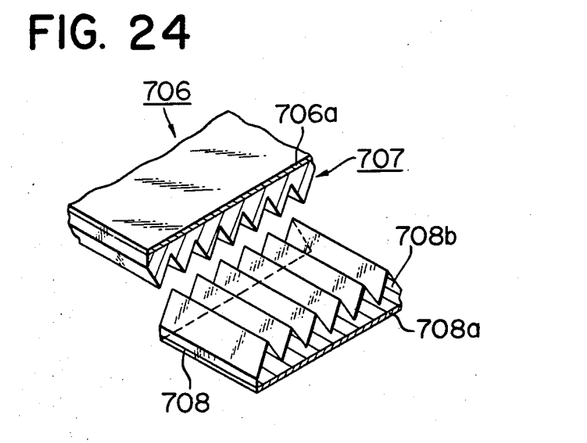
FIG. 24 shows, in perspective view, the ends of the light-guide cables which are to be joined.
Figure 25:
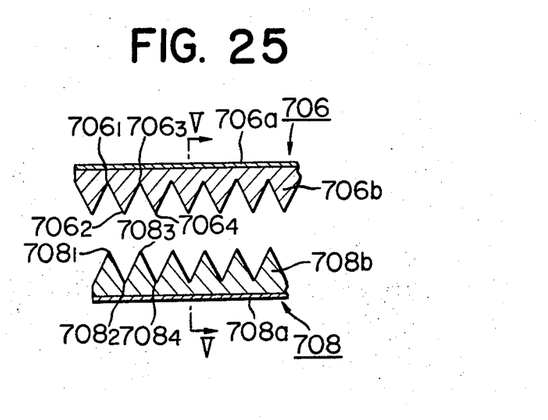
FIG. 25 is a cross sectional view of the light-guide cables shown in FIG. 24.
Figure 26:
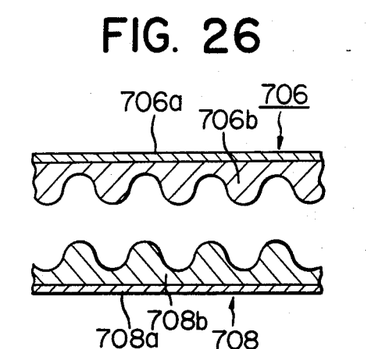
FIG. 26 shows, in cross section, the ends to be connected of the light-guide cables.

Referring to FIGS. 24 and 25, the light-guide cables used in the present invention are in general flat or thin rectangular in cross section may be, "rectangular in cross section" is correct, and the coupler or connector 707 is of the half lap joint type or the mortise-and-tendon type or the combination thereof. One or lower major surface cladding $706_a$ of the light-guide cable 706 is removed to expose its core $706_b$ and teeth $706_2$ through $706_{2n}$ triangular in cross section are formed in the core $706_b$. In like manner, one or upper major surface cladding $708_a$ of the light-guide cable 708 is removed to expose its core $708_b$ and teeth $708_1$ through $708_{(2n+1)}$ of the shape adapted to snugly mate with the teeth of the light-guide cable 706 are formed in the core. The mortise or joint of the light-guide cable 706 and the tenon or joint of the light-guide cable 708 may have any suitable cross section such as a rectangular or square or sinusoidal cross section (See FIG. 26).

Figure 27:
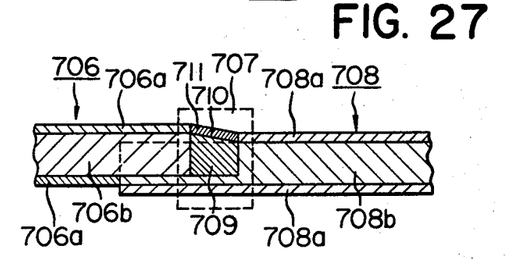
FIG. 27 is a longitudinal sectional view taken along the line V—V of FIG. 25 and showing the light-cables joined.

FIG. 27 is a longitudinal sectional view taken along the line V—V of FIG. 25 and showing the joint 707 between the light-guide cables 706 and 708. First the teeth of the light-guide cables 706 and 708 are snugly engaged with each other, and then an optically transparent compound 709 is melted and poured into the space between the teeth of the light-guide cable 708. Thereafter a lift-reflection film or coating 710 is applied over the transparent compound 709, and a protective layer 711 is formed.

The solar energy is transmitted from the light-guide cable 706 into the light-guide cable 708 through the interface therebetween. Some of the solar energy transmitted through the light-guide cable 706 is reflected by the reflecting film 710 so as to enter the light-guide cable 708.

Figure 28:
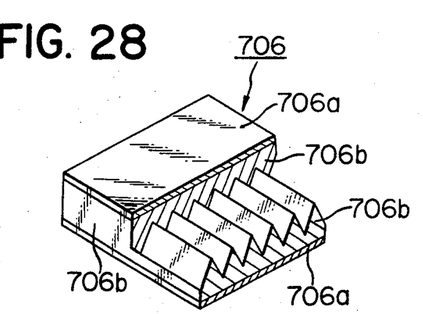
FIG. 28 is a perspective view of a modification of the joint preparation of the light-guide cable.
Figure 29:
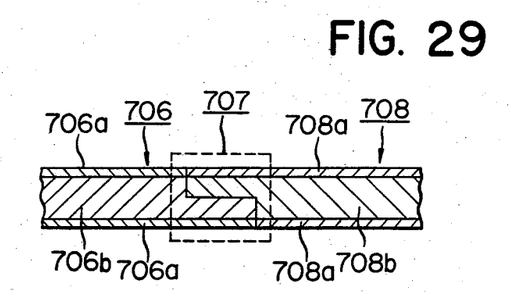
FIG. 29 is a longitudinal sectional view showing the joint between the light-guide cables with the end preparation shown in FIG. 28.

In FIGS. 28 and 29 is shown a modification of the joint 707 described above with reference to FIGS. 24 through 27. The ends to be joined of the light-guide cables 706 and 708 can be prepared in the same manner, and the cables 706 and 708 can be joined in a very simple manner without the above-described additional steps of filling the transparent compound 709, forming the reflecting film 710 and applying the protective coating 711.

So far the light-guide cable 706 has been described as being joined to the single light-guide cable having the same cross section as the cable 706, but it is to be understood that the light-guide cable 706 may be joined to a plurality of light-guide cables in a manner substantially similar to that described above. That is, the end to be joined of the light-guide cable 706 is enlarged in cross section so as to afford the connection to a plurality of light-guide cables. Alternatively, the ends of the light-guide cables to be connected to the light-guide cable 706 are reduced in cross section.

Figure 30:
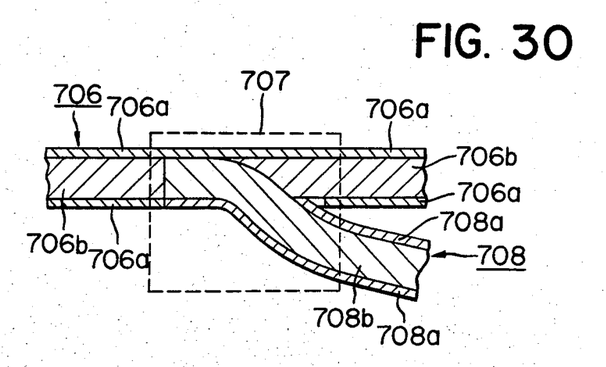
FIG. 30 is a longitudinal sectional view showing the light-guide cable branched from the light-guide cable according to the present invention.

So far the light-guide cable 706 has been described as being connected to one or more light-guide cables straightly or in series, but it is to be understood that the light-guide cable 706 can be branched to the light-guide cable 708 as shown in FIG. 30.

The light-guide cables which are joined in the manner described above may be fabricated by the injection molding so that they may have the same cross section throughout their whole lengths. Alternatively, the ends of the commercially available light-guide cables may be heated and molded to have the desired cross sections.

In summary, when the light-guide cables in accordance with the present invention the light-guide cables can be joined or branched in a very simple manner and the transmission losses may be made almost negligible. In addition, one light-guide cable can be joined to one or more light-guide cables in a very simple manner.

What is claimed is:

1. A light energy collection apparatus comprising:
    an optical system for collecting light energy from a light source, comprising:
        a lens system for converging the light energy,
        an optical coupler upon which the light energy is focused through said lens system, and
        a light-guide cable with one end connected to said optical coupler so that the light energy focused on said optical coupler enters said light-guide cable,
    a supporting framework for supporting said optical system;
    a tracking device for driving said supporting framework in such a way that the optical system is normally kept pointed at said light source, said tracking device comprising:
        a main shaft supported for rotation,
        one or more light energy collectors each mounted on said main shaft for rotation about an axis perpendicular to the axis of said main shaft, and
        means for rotating said one or more light energy collectors about their axes of rotation;
    a device for detecting the position of said light source, said device including a weight mechanism mounted on said main shaft in such a way that regardless of the angular position of said main shaft, said weight mechanism is normally vertically oriented;
    a spherical lens mounted on said weight mechanism, and a plurality of optical sensors situated at the focal points of said spherical lens,
    whereby in response to the outputs from said optical sensors, the direction or position of said light source is detected;
    an optically transparent housing enclosing said optical system and said tracking device; and
    a supporting means for supporting said housing.

2. A light energy collection apparatus comprising:
    an optical system for collecting light energy from a light source;
    a converter means for converting the collected light energy into electrical or thermal energy;
    a supporting framework for supporting said optical system and said converter means;
    a tracking device for driving said supporting framework in such a way that the optical system is normally kept pointed at said light source, said tracking device comprising:
        a main shaft supported for rotation,
        one or more light energy collectors each mounted on said main shaft for rotation about an axis perpendicular to the axis of said main shaft, and
        means for rotating said one or more light energy collectors about their axes of rotation;
    a device for detecting the position of said light source, said device including a weight mechanism mounted on said main shaft in such a way that regardless of the angular position of said main shaft, said weight mechanism is normally vertically oriented;
    a spherical lens mounted on said weight mechanism, and a plurality of optical sensors situated at the focal points of said spherical lens, whereby in response to the outputs from said optical sensors, the direction or position of said light source is detected;

an optically transparent housing enclosing said optical system and said tracking device; and supporting means for supporting said housing.

3. A light energy collection apparatus, comprising:
a rotatable lens system for converging radiation from a light source;
tracking means for rotating said lens system to track said light source;
a rotatable main shaft for supporting said lens system;
a first light-guide cable mounted for rotation with said main shaft, said cable having a light input end disposed in the focal region of said lens system for receiving light energy therefrom, and a light output end; and
a second relatively stationary light-guide cable having a light input end adjacent to, coaxial with and optically coupled to the light output end of said first light-guide cable, said second light-guide cable having a light delivery end remote from the light input end thereof for illuminating a region remote from said lens system.

4. The apparatus according to claim 3, wherein said lens system is rotatable about two mutually orthogonal axes, the weight of said lens system being balanced with respect to each of said axes so that the power required for rotating said lens system is minimized.

5. The apparatus according to claim 3, wherein said light output end of said first light-guide cable is disposed within and coaxial with said main shaft.

6. The apparatus according to claim 3, wherein said tracking means rotates said main shaft through a worm, a worm wheel in mesh with said worm, and a torque limiter means interposed between said main shaft and said worm wheel.

7. The apparatus according to claim 3, 4, 5 or 6, wherein the light input end of said first light-guide cable comprises a plurality of light transmissive layers having different refractive indices.

8. The apparatus according to claim 3, 4, 5 or 6, wherein said light input end of said first light-guide cable comprises a plurality of optical fibers in intimate contact with each other, each of said fibers having a hexagonal cross-section.

9. A light energy collection apparatus as set forth in claim 3, 4, 5 or 6, wherein said input end of said first light-guide cable has a refractive-index gradient which is gradually increased from the input end to the output end thereof.

10. A light energy collection apparatus as set forth in claim 3, wherein adjacent ends of said second light-guide cable and another light-guide cable are formed with rectangular cross-sections, and with ridges and recesses in each of said adjacent ends respectively in parallel with the direction of transmission of light energy, with said adjacent ends being intermeshed to form a joint for end-to-end connection or branching.

11. A light energy collection apparatus, comprising:
a lens system rotatable about two mutually orthogonal axes and supported by a main shaft, for converging radiation from a light source, the weight of said lens system being balanced with respect to each of said axes so that the power required for driving said lens system is minimized;
tracking means for rotating said lens system to track said light source, said tracking means comprising one or more light energy collectors each mounted on said main shaft for rotation about the axis perpendicular to the axis of said main shaft, and a means for rotating said one or more light energy collectors about their axes of rotation; and
light transmission means including a light-guide cable having a light receiving end and a light distribution end for coupling light from said lens system to illuminate a region remote therefrom.

12. The apparatus according to claim 11, wherein said tracking means rotates said main shaft through a worm, a worm wheel in mesh with said worm, and a torque limiter means interposed between said main shaft and said worm wheel.

13. The apparatus according to claim 11 or 12, wherein the light receiving end of said light-guide cable comprises a plurality of light transmissive layers having different refractive indices.

14. The apparatus according to claim 11 or 12, wherein said light input end of said first light-guide cable comprises a plurality of optical fibers in intimate contact with each other, each of said fibers having a hexagonal cross-section.

15. A light energy collection apparatus, comprising:
a lens system rotatable about two mutually orthogonal axes and supported by a main shaft, for converging radiation from a light source, the weight of said lens system being balanced with respect to each of said axes so that the power required for driving said lens system is minimized;
tracking means for rotating said lens system to track said light source, said tracking means comprising one or more light energy collectors each mounted on said main shaft for rotation about the axis perpendicular to the axis of said main shaft, and a means for rotating said one or more light energy collectors about their axes of rotation through a worm, a worm wheel in mesh with said worm, and a torque limiter means interposed between said main shaft and said worm wheel; and
a first light-guide cable mounted for rotation with said main shaft, said cable having a light input end disposed in the focal region of said lens system for receiving light energy therefrom, and a light output end; and
a second relatively stationary light-guide cable having a light input end adjacent to, coaxial with and optically coupled to the light output end of said first light-guide cable, said second light-guide cable having a light delivery end remote from the light input end thereof for illuminating a region remote from said lens system.

16. The apparatus according to claim 15, wherein said light output end of said first light-guide cable is disposed within and coaxial with said main shaft.

17. The apparatus according to claim 15 or 16, wherein the light input end of said first light-guide cable comprises a plurality of light transmissive layers having different refractive indices.

18. The apparatus of claim 15 or 16, wherein said light input end of said first light-guide cable comprises a plurality of optical fibers in intimate contact with each other, each of said fibers having a hexagonal cross-section.

19. A light energy collection apparatus as set forth in claim 3, 11 or 15, wherein
said tracking means comprises at least one pair of optical sensors located in the same plane between said lens system and the focal point thereof and adjacent to the beam of the light energy being converged through said lens system; and
said lens system is driven by said tracking means so that the output signals from said pair of optical sensors are normally balanced with each other.

* * * * *